W. M. STORM.
Breech-Loading Fire-Arm.
No 2,446. Reissued Jan. 1, 1867.
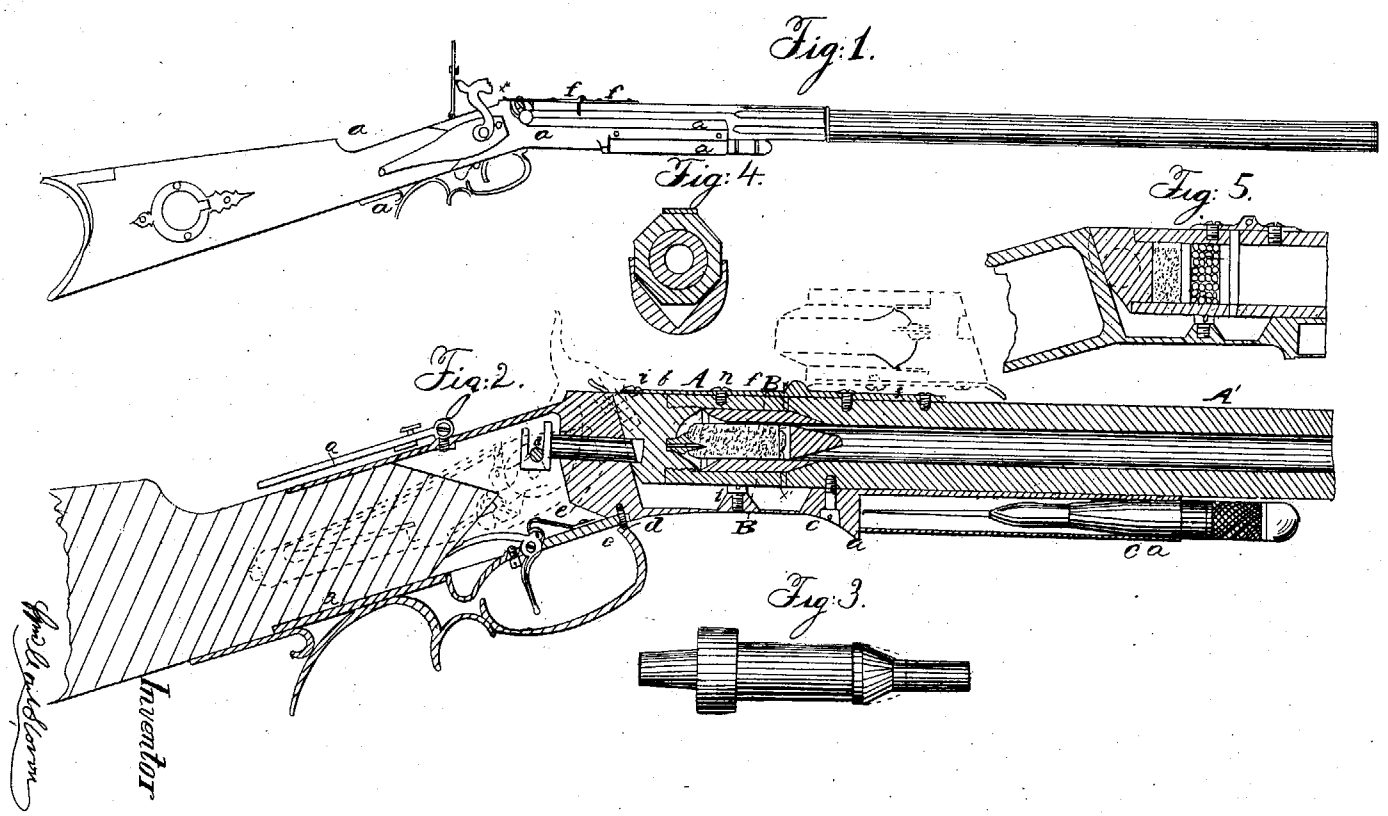
N. PETERS, PHOTO-LITHOGRAPHER, WASHINGTON, D. C.

UNITED STATES PATENT OFFICE.

WILLIAM MONT STORM, OF NEW YORK, N. Y.

IMPROVEMENT IN BREECH-LOADING FIRE-ARMS.

Specification forming part of Letters Patent No. 15,307, dated July 8, 1856; Reissue No. 2,446, dated January 1, 1867.

DIVISION B.

*To all whom it may concern:*

Be it known that I, WM. MONT STORM, of the city and State of New York, have invented certain new and useful Improvements in Breech-Loading Fire-Arms, such improvements being applicable, in whole or part, to fire-arms of several styles and dimensions; and this specification is a full, clear, and exact description of the same, reference being had to the accompanying drawings and the letters of reference thereon.

My improvements appertain, more particularly, to that class of breech-loading fire-arms having a breech-piece hinged near the top of the barrel, so as to turn upward and forward to such a position as to permit the convenient insertion of the cartridge, in contradistinction to that class having a breech-piece to slide either longitudinally with or transversely to the line of the bore, which latter plans in particular, as usually carried out, involve several radical defects and sources of derangement. For instance, the opposite surfaces of the barrel and breech-piece, in almost every case, rub over each other with more or less force, causing wear and loosening of the joint. Worse still, however, is the abrading action upon these surfaces by rubbing over the fine particles of solid residuum liable to be blown into the joint at each discharge; and when a comparatively small leakage has been thus produced, it is rapidly augmented by the red-hot gases of the explosion forcing through and producing what has sometimes been termed "cutting." My improvements are designed to obviate not only these defects, (more peculiar to arms with a sliding breech-piece,) but others not here referred to, in arms with breech-pieces hinged as before mentioned, and in which no wear of the breech-joint by rubbing is necessarily involved.

For details of construction and operation, I will now refer to the drawings connected herewith, in which—

Figure 1 is an external side view, and Fig. 2 a central vertical longitudinal section, full size, of that portion embracing all the operating parts of the weapon.

The stock *a* is shown as of metal, in a single piece from its forward end back to where it is fixed to the "hand part" of the "wooden butt."

A′ is the barrel, firmly fitted into the stock, and so fixed by screws, as shown. In lieu of screw *c*, a loop and bolt may be used in this style of my arm.

The joint between the breech-piece and barrel is at *x′ x′*, (see Fig. 2,) and the joint of the hinge, by which the breech-piece turns upward out of its bearings and into a position to permit the ready loading of the weapon, is in close proximity to the breech-joint and to the top of the barrel, as shown. When the breech-piece is in place for the discharge of the weapon, its rear end, *b*, (section lined in blue,) bears against the stationary recoil-bearing *d*, (section lined in bronze color,) and this bearing is extended up to the very top of the barrel, thus obtaining the greatest amount of bearing-surface possible above the line of the bore of the gun while consistent with symmetry. This is an important feature, for, as will be evident, the nearer to vertical the recoil bearing-surfaces are the less the tendency of the recoil will be to force upward the breech-piece, and inasmuch as every point on the rear of the breech-piece must describe, in the act of lifting the latter, an arc of a circle struck from the center of the hinge, and to which arc, of course, the recoil bearing-surfaces can conform, it will be perceived that these surfaces would be nearer vertical the higher they extended up toward a point level with the hinge-joint. Acting still further on this idea, I cut away the lower portion of the bearing-surface, as shown, (or it may be from *d*, as equivalent,) so as to insure that the whole or the principal part of the bearing-surface shall be above the line of the axis of the bore of the gun, by which, as will be readily understood, the tendency of the recoil is to throw the whole breech-piece, forward of the recoil-bearing, downward into its receptacle, in lieu of upward and outward, as would be the case if, from any cause, the lower portion bore more firmly than the upper. Although by these means I reduce to a minimum the tendency of the hinged breech-piece to fly out by the force of the recoil, to insure the securing of the recoil-bearings in the proper position at the moment of discharge, I employ an automatic device connected with the lock in such a way that by a "positive" motion they shall be so secured during the fall of the hammer. This device is constituted of a bolt, *e*, Fig. 2, fitting in and passing through the stationary recoil-bearing *d* and into the rear of the breech-piece, the rear end of such bolt being connected with and operated by a stud connected with the tumbler of the lock, and the length of said bolt being properly proportioned, its forward end will be projected into the breech-piece, thus fastening it when the hammer is down and withdrawn from and releasing it when the hammer is raised. Other ways of connecting the bolt with the lock, so as to be operated by a positive motion, might be devised, but, in my opinion, not so convenient. To correspondingly secure the forward end of the breech-piece from displacement from any cause when down, it is there provided with a conical or tapering projection (see Fig. 2) that enters a certain distance into the barrel as the breech is closed, the effect of which is readily understood. This projection is made tapering, so that it shall leave its seat without rubbing as the breech-piece is lifted.

It will be seen, Figs. 2 and 4, that the breech-piece does not fit its receptacle beneath, but that a space is purposely there formed between them. The purpose of this I will explain as follows: Supposing by chance a shot or shell struck near a soldier while in the act of loading, and should scatter gravel and dirt, some of which should lodge in the breech-piece receptacle; or suppose the same should be effected by the wind when firing near an embankment or earthwork, for instance, now the gavel being coarser could be tossed out by a simple movement, but a portion of the dirt would tend to remain, particularly if moist, and would require time to be wiped out, or else it would prevent the breech-piece from coming down to its place, if the latter and its receptacle were a fit beneath. The same would apply to hail and snow, or any fine-grained obstruction. By making the space referred to, the inconvenience of such a contingency is almost entirely avoided. I so construct and arrange the hinge upon which my breech-piece moves that the latter may turn so far over (see Fig. 2) that its opposite side may be supported, and its momentum checked by the barrel, and not by the joint of the hinge, which would in such case receive objectionable strain, particularly when the breech-piece was thrown over with quickness and force. Moreover, being thus in a position about horizontal, the breech, when open for loading, for instance, is less liable to be accidentally thrown back into its receptacle by the jumping of the horse of a mounted man or cavalry soldier.

In lieu of employing any prolongation of the hinged breech-piece backward over the hand part of the stock, by which to facilitate the raising of it from its receptacle, as in some arms, I employ a round knob, or its equivalent, fixed with and projecting laterally from near the rear of the breech-piece near its recoil-bearing and the hammer and on the same side as the latter, and with which latter, in a sense, its function is combined, for as the hammer is cocked and the thumb still rests upon it as a fulcrum, so to speak, the forefinger is hooked under the knob, and by a grip of the finger and thumb toward each other the breech-piece is forcibly lifted from its bearings (even if there should be slight adhesion because of rust or other fouling) without any motion of the arm or twisting of the weapon in the left hand. Then the breech is thrown over by an almost simultaneous action, so that by this simple device the cocking of the hammer and throwing out of the breech-piece in point of ease and rapidity practically constitutes but a single movement. I should also have pointed out that my breech-piece, when in place in its receptacle, lies entirely forward of the point at which is usually located what is generally called the "break-off," as also of the hand part of the stock, which is the smallest and weakest portion of the latter, and is still further weakened by being made the receptacle of the hinged breech-piece, as in some other arms.

To prevent, irrespective of the kind of ammunition used, the escape of gas at the joint *x′ x′* at the moment of discharge, I make the conical projection at the forward end of the breech, (and entering the barrel, as before mentioned,) not solid with the former, but in the form of a movable tube or ring projecting back into and crossing the said joint sufficiently far and in such manner that the force of the explosion itself acting upon it shall tighten the joint. To this end the rear of the tube, ring, or thimble, whichever it may be called, is enlarged at the interior of its rear, so that the gases shall tend to move it bodily forward to tighten it in the barrel, while its rear at the same instant is expanded, so as to tighten it in the breech-piece sufficiently to prevent escape at that point, but not to prevent its tendency to press forward. The material and thickness of this gas-check must be such that it shall effectually resist any permanent change of size or form by the force of the explosion.

I am aware that thimble or ring gas-checks have been used, but not of the form I have described, and projecting across the joint and operated solely by the force of the explosion, either in arms having a breech-piece hinged as mine, or otherwise.

Referring again to the connection of the bolt *e* (that secures the breech-piece in its place) with the tumbler of the lock, it will be seen (Fig. 2) that this is effected by means of a headless stud moving with the tumbler and traversing in a slotted head on the rear end of the bolt, and that by this arrangement the lock may be removed for cleaning or other purposes and replaced without disturbing other parts. My plan, perhaps, would apply advantageously to cannon with simply such modifications of form as would be entailed by the difference of form between these and hand-arms.

Having now fully described the nature of my improvements, what I claim, and desire to secure by Letters Patent, is as follows:

1. A chambered breech-piece, when such breech-piece is hinged at its forward end to the barrel, and arranged to swing over, substantially as described, for the purpose set forth.

2. In combination with the barrel and movable breech, a packing tube or ring arranged to slide within the breech-piece, and formed at the front end to enter the barrel, so that by the force of the discharge the said tube will be forced forward and into the barrel and made to pack the joint between the barrel and breech-piece, to prevent the escape of the explosive gases.

3. The manner, substantially as shown and described, of coupling the bolt *e* with the tumbler, so that although said bolt is operated by a positive motion, as described, the lock can be removed regardless of the barrel and bolt, as hereinbefore set forth.

WM. MONT STORM. [L. S.]

Witnesses:
A. DE LACY,
JOHN MCINTYRE.